US007575157B2

(12) United States Patent　　(10) Patent No.: US 7,575,157 B2
Barnhardt et al.　　(45) Date of Patent: Aug. 18, 2009

(54) FRAUD PROTECTION

(75) Inventors: David Wayne Barnhardt, Huntersville, NC (US); Charles F. Pigg, Plano, TX (US)

(73) Assignee: Bank of America Corporation, Charlotte, NC (US)

( * ) Notice: Subject to any disclaimer, the term of this patent is extended or adjusted under 35 U.S.C. 154(b) by 71 days.

(21) Appl. No.: 11/752,224

(22) Filed: May 22, 2007

(65) Prior Publication Data

US 2008/0290154 A1　Nov. 27, 2008

(51) Int. Cl.
*G06Q 40/00*　(2006.01)
(52) U.S. Cl. .................. 235/379; 235/380; 705/42; 705/43; 705/44; 705/379
(58) Field of Classification Search .............. 235/380; 705/42–44; 380/51
See application file for complete search history.

(56) References Cited

U.S. PATENT DOCUMENTS

| | | | | |
|---|---|---|---|---|
| 6,600,823 | B1* | 7/2003 | Hayosh | 380/51 |
| 7,016,524 | B2* | 3/2006 | Moore | 382/137 |
| 7,233,690 | B2* | 6/2007 | Lacy | 382/137 |
| 7,337,119 | B1* | 2/2008 | Geschwender et al. | 705/1 |
| 2005/0097046 | A1* | 5/2005 | Singfield | 705/42 |
| 2005/0125351 | A1 | 6/2005 | Tidwell et al. | |
| 2006/0131384 | A1 | 6/2006 | Ahles et al. | |
| 2006/0202012 | A1 | 9/2006 | Grano et al. | |

OTHER PUBLICATIONS

PCT International Search Report, International Application No. PCT/US2008/064491, mailed Sep. 1, 2008, 9 pages.

* cited by examiner

*Primary Examiner*—Allyson N Trail
(74) *Attorney, Agent, or Firm*—Banner & Witcoff, Ltd.; Michael A. Springs

(57) ABSTRACT

Systems and methods are illustrated for providing enhanced fraud protection. Aspects of the fraud protection system may be implemented by a filter that may be configured to detect fraud in a transaction between a financial institution and a customer. An input device may receive data that corresponds to a transaction between a financial institution and a customer, such as a transfer of money. A data store may store information relating to the transaction that includes the serial number and dollar amount of the transfer of money. When the filter detects fraud, an output device may output an alert resulting in zero false positives. The filter may also include a module that is configured to compare the data that is received by an input device to data that is stored in the data store. Oftentimes, the data in the data store may be information relating to past fraud protection.

28 Claims, 3 Drawing Sheets

FRAUD PROTECTION

FIELD OF TECHNOLOGY

Aspects of the disclosure relate to protecting against fraud in transactions between a financial institution and a consumer and/or a business. More specifically, aspects of the disclosure relate to filtering a transfer of money through enhanced fraud protection.

BACKGROUND

Financial institutions suffer extreme financial losses each from as a result of fraudulent behavior. Oftentimes, a significant portion of the fraud includes a transfer of money to or from an account at the financial institution. For example, a customer may attempt to cash and/or deposit a fraudulent negotiable instrument with a teller at the financial institution, at an automated teller machine, or through a website that is accessible through the Internet. Some customers are aware that the transfer of money is fraudulent and actively participate in defrauding the financial institution. Other customers fall victim to organized fraud schemes that are designed to harm both the customer and the financial institution by performing an unauthorized money transfers to perpetrators.

The financial institution performs a lengthy verification process it receives a request to transfer money. The verification process often lasts for several days when negotiable instrument such as a check is presented for payment. In many situations, the financial institution (e.g., bank) transfers the money before it completes the verification process. Therefore, there exists a need for a fraud detection system and/or method that identifies and reacts to fraudulent transactions in a near real time basis and with a high accuracy.

BRIEF SUMMARY

Patent Application

The following presents a simplified summary of the disclosure in order to provide a basic understanding of some aspects. It is not intended to identify key or critical elements of the invention or to delineate the scope of the invention. The following summary merely presents some concepts of the disclosure in a simplified form as a prelude to the more detailed description provided below.

In one embodiment in accordance with aspects of the disclosure a method of providing enhanced fraud protection is disclosed. Transfer data may be received, wherein the transfer data corresponds to a transaction that may include a transfer of money. The transfer data may be compared to filter data in a data store where the filter data may include at least one serial number and at least one dollar amount. An alert may be output when fraud is detected in the transaction that results in zero false positives.

In some embodiment in accordance with aspects of the disclosure a system for providing enhanced protection from fraud is provided. The system may comprise an input device (e.g., a check image scanner) that is configured to receive data corresponding to a transaction including a transfer of money. The system may also include a filter that is configured to detect fraud in a transaction where the protection against the fraud occurs with zero false positives. A data store comprising at least one serial number and at least one dollar amount may also be included in the system. The system may include an output device (e.g., a display screen on a computing device) that may be configured to output an alert if fraud is detected in the transaction.

In yet another embodiment in accordance with aspects of the disclosure a computer-readable medium is disclosed that stores computer-executable instructions causing a processor to perform a method. Data may be received that corresponds to a transaction that includes a transfer of money. The data corresponding to the transaction may be compared to data that is stored in a data store. The data in the data store may include at least one serial number and at least one dollar amount. An alert having zero false positives may be output if fraud is detected in the transaction.

One skilled in the art will appreciate that one or more of the aforementioned methods and features may be embodied as computer-executable instructions stored on a computer-readable medium and executed by a processor.

BRIEF DESCRIPTION OF THE DRAWINGS

The present disclosure is illustrated by way of example and not limited in the accompanying figures in which like reference numerals indicate similar elements and in which.

DETAILED DESCRIPTION

In accordance with various aspects of the disclosure, systems and methods are illustrated for protecting against fraud involving a transfer of money.

Figure 1:
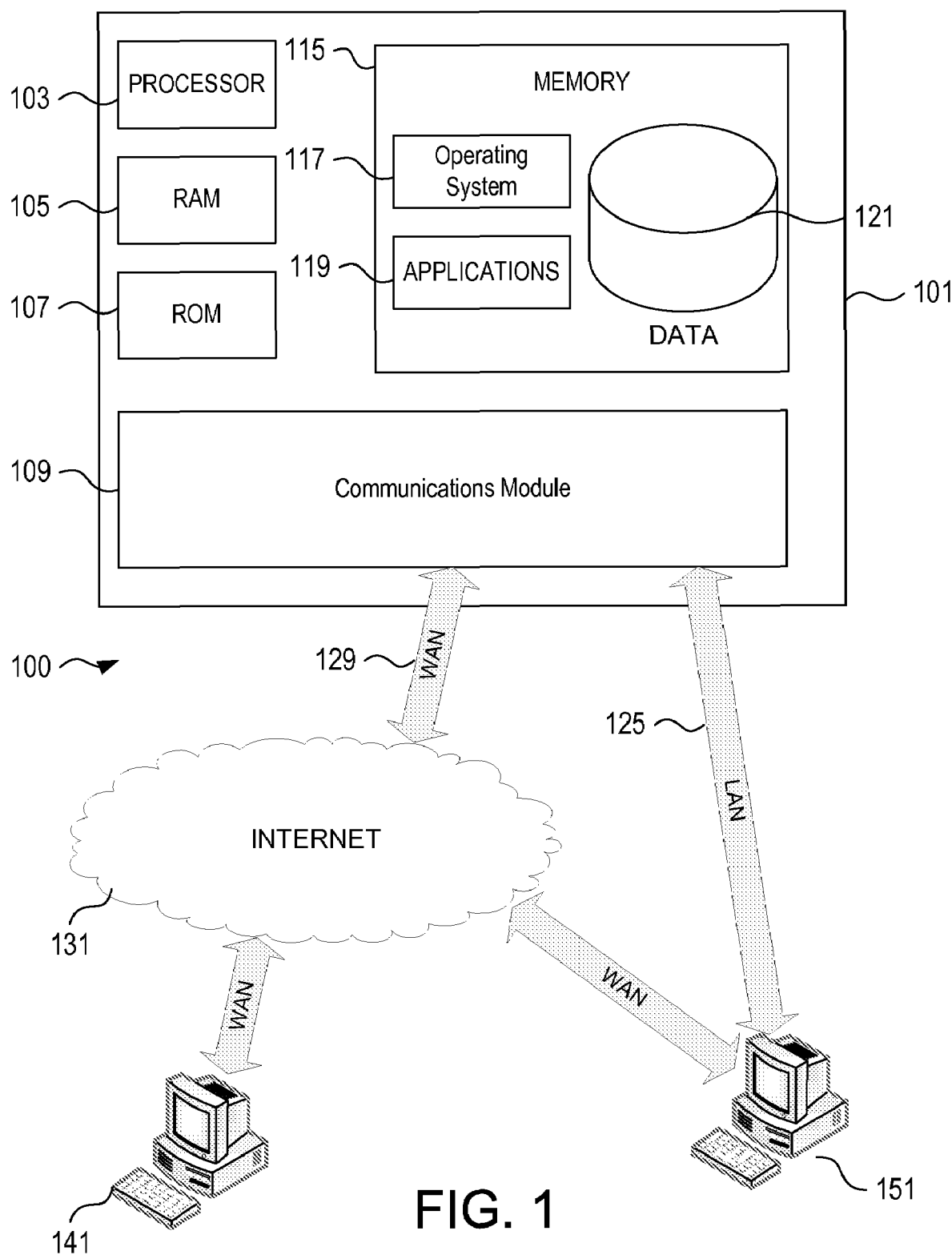
FIG. 1 illustrates a schematic diagram of a general-purpose digital computing environment in which various aspects of the disclosure may be implemented.

FIG. 1 illustrates an example of a suitable computing system environment 100 that may be used according to one or more illustrative embodiments of the invention. The computing system environment 100 is only one example of a suitable computing environment and is not intended to suggest any limitation as to the scope of use or functionality of the invention. The computing system environment 100 should not be interpreted as having any dependency or requirement relating to any one or combination of components illustrated in the exemplary computing system environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, the computing system environment 100 may include a computing device 101 having a processor 103 for controlling overall operation of the computing device 101 and its associated components, including RAM 105, ROM 107, communications module 109, and memory 115. Computing device 101 typically includes a variety of computer readable media. Computer readable media may be any available media that may be accessed by computing device 101 and include both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computing device 101. Communication media typically embodies computer readable instructions, data structures, program modules or other data in a modulated data signal such as a carrier wave or other transport mechanism and includes any information delivery media. Modulated data signal is a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media. Although not shown, RAM 105 may include one or more are applications representing the application data stored in RAM memory 105 while the computing device is on and corresponding software applications (e.g., software tasks), are running on the computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output. Software may be stored within memory 115 and/or storage to provide instructions to processor 103 for enabling computing device 101 to perform various functions. For example, memory 115 may store software used by the computing device 101, such as an operating system 117, application programs 119, and an associated database 121. Alternatively, some or all of the computer executable instructions for computing device 101 may be embodied in hardware or firmware (not shown). As described in detail below, the database 121 may provide centralized storage of account information and account holder information for the entire business, allowing interoperability between different elements of the business residing at different physical locations.

Computing device 101 may operate in a networked environment supporting connections to one or more remote computing devices, such as branch terminals 141 and 151. The branch computing devices 141 and 151 may be personal computing devices or servers that include many or all of the elements described above relative to the computing device 101. The network connections depicted in FIG. 1 include a local area network (LAN) 125 and a wide area network (WAN) 129, but may also include other networks. When used in a LAN networking environment, computing device 101 is connected to the LAN 125 through a network interface or adapter in the communications module 109. When used in a WAN networking environment, the server 101 may include a modem in the communications module 109 or other means for establishing communications over the WAN 129, such as the Internet 131. It will be appreciated that the network connections shown are illustrative and other means of establishing a communications link between the computing devices may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, an application program 119 used by the computing device 101 according to an illustrative embodiment of the invention may include computer executable instructions for invoking user functionality related to communication, such as email, short message service (SMS), and voice input and speech recognition applications.

Figure 2:
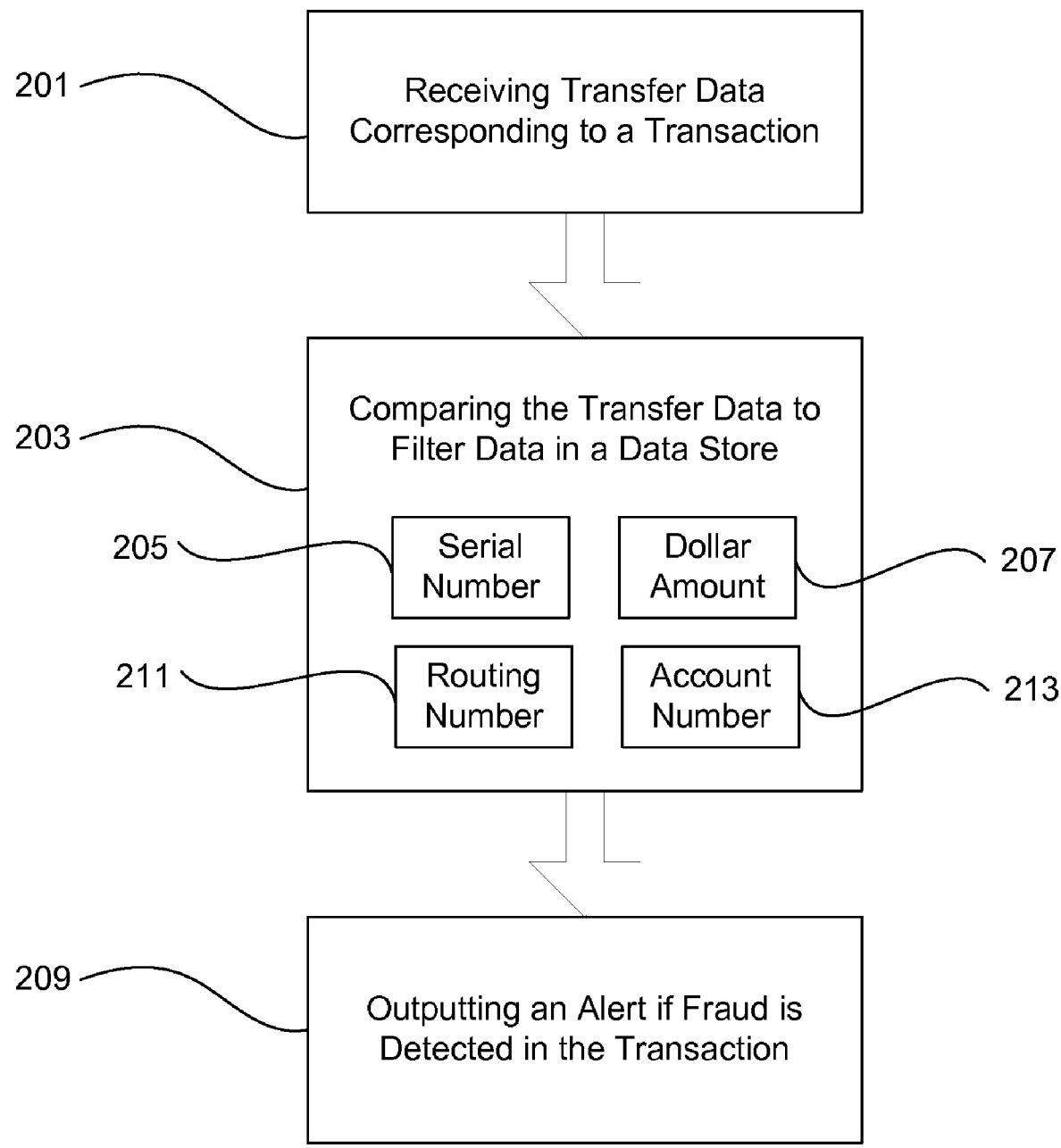
FIG. 2 shows an illustrative method in which various aspects of the disclosure may be implemented.

FIG. 2 illustrates a method of providing enhanced protection from fraud. Transfer data may be received where the transfer data corresponds to a transaction that includes a transfer of money at step 201. The transfer data may be compared to filter data that is in a data store at step 203. The filter data may include at least one serial number 205, at least one dollar amount 207, at least one routing transit number 211, and/or at least one account number 213. For example, when the transfer data is compared to the filter data, the serial number 205 that is associated with the transaction may be compared with at least one serial number that is in a data store. An alert may be output if fraud is detected in the transaction at step 209. The alert may result in zero false positives.

Enhanced protection from fraud may include protection from such fraud as Advanced Fee Scams and Nigerian 419 Fraud Rings. The fraud protection may be identified by a fraud type. The fraud type may include an Advanced Fee Scam, a Nigerian 419 Fraud Ring, and/or a transfer of money from a closed account or non-existent account (e.g., invalid routing transit number and/or invalid account number). An Advanced Fee Scam preys on customers to obtain their confidence so that the customer advances money to the perpetrator in hopes of realizing a large sum of money in the future. In an Advanced Fee Scam, the customer may be contacted and informed of a lottery winning, charitable need, "innocent" white collar crime, or the like. Through an enticing offer, the perpetrator convinces the customer to transfer money to an account. In some circumstances, the perpetrator will send the customer a check or other negotiable instrument for a relatively small amount of money for a "fee" or "tax" that is alleged to be required prior to the customer receiving the large sum of money. The customer may present it for payment at a financial institution. The customer is also requested to send the money to the perpetrator for payment of the fee or tax.

When the customer presents the negotiable instrument to the financial institution, the negotiable instrument must go through a verification process, including check processing. However, in some circumstances, the financial institution may transfer money before the negotiable instrument is verified. Thus, money from the customer's is transferred to the perpetrator's account before the money transfer request "clears" the customer's account. Both the customer and the financial institution suffer a financial loss, while the perpetrator enjoys the stolen funds.

Specifically, the Nigerian 419 Scam may be facilitated by a perpetrator that sends a victim a letter claiming to be an official from the Nigerian government. The letter may present the victim with an enticing offer of a commission if the victim chooses to transfer money on behalf of the government or a wealthy citizen. Further, the letter may inform the victim of lottery winnings, the purchase of a product, or acceptance of a job posting. Sometimes, the letter may state a reason for the request to transfer the funds including, but not limited to, paying for costs associated with the money transfer, paying for taxes associated with the money transfer, and the like. The letters provide the victim with a counterfeit check and often request a relatively small amount of money from the victim to entice the victim into the scheme.

The customers demand that the financial institution quickly provide availability to the funds when a request is made to transfer money into a customer account. For example, when customers present a check for deposit into an account at their financial institution, they expect that the funds associated with the check will be available for their use in a relatively short period of time. The financial institution may place a hold on the check or may require that the request remain "pending" until the check has been verified. The financial institution may choose to release the money into the customer's account before the financial institution verifies the check's authenticity. This may result in large financial loss to the customer and to the financial institution.

Additionally, a customer may commit fraud on financial institutions to obtain unauthorized access to money. For example, a customer may knowingly present a bad check and obtain cash for the bad item from the financial institution. This may occur when the customer is aware that the customer's account is overdrawn, when the customer is aware that the customer's account is closed, and/or when the customer attempts to withdraw money from a non-existent account. This type of fraudulent behavior occurs during a request to transfer money at a teller at a financial institution or at an automated teller machine (ATM). The teller or ATM receives input information about the request to transfer money. The information relating to the request to transfer money may be input into an internal system within the financial institution. The financial institution may utilize this information to protect itself and its customers against fraudulent behavior. The financial institution may also maintain records of information relating to previous fraudulent behavior to assist in preventing future fraudulent behavior. One of ordinary skill in the art will appreciate that many types of fraudulent behavior occur and only a small portion of the potential problems that financial institutions face have been described herein. Further, one of ordinary skill in the art will recognize that new fraudulent behavior may be developed to which the present disclosure may be applicable.

At step 201, transfer data is received. The transfer data may include information corresponding to a transaction that includes a transfer of money. The transaction may be any request to access funds associated with a customer's account. The transaction may be a request to transfer money between accounts, to deposit money into an account, the withdraw money from an account, the cash a check, apply for credit, pay a credit card, mortgage, or personal line of credit, and the like. A transfer of money may or may not be included in the transaction, but most often is included in the transaction. When the transaction is a presentment of a check for payment or deposit, the transfer data may include data on the check. A person having ordinary skill in the art will appreciate that transfer data may include any information related to the transaction.

At step 203, the transfer data may be compared to filter data in a data store. The filter data may include any information to which a financial institution may compare the transfer data that is associated with the transaction. The filter data may be stored in a data store. In one example, a data store is a high-capacity storage device that can store information. The data store may be a hard drive or a R.A.I.D drive. One skilled in the art will appreciate that a centralized data store that gathers filter data from a wider region (e.g., nationwide) may result in a more enhanced data store than regional data stores that collect filter data from transactions from a limited region. In any event, the filter data may be used at check processing facilities, retail banking facilities, automated teller machines (ATMs), etc. where a transaction involving the transfer of money is involved. Where appropriate, neural network (or comparable) logic may be used to enhance the gathering and refinement of the filter data stored in the data store. For example, as new transfer data is identified as part of an advanced fee scam, the filter data in the data store may be updated accordingly.

The filter data may include information relating to at least one serial number 205, at least one dollar amount 207, at least one routing transit number 211, and/or at least one account number 213. The serial number 205 may be a unique number that is associated with a customer account that may be used for identification purposes. The serial number 205 may include all or a portion of the unique number associated with the customer account. A plurality of serial numbers 205 may be included in the filter data. The plurality may include a range of serial numbers 205. The range may be a group of serial numbers 205 in numerical order or a group of serial numbers 205 that are grouped in any desirable manner.

Furthermore, the filter data may include the full account number and/or a range of suspicious routing transit numbers. Such filter data may be stored in a data store and used by the filter to compare the full account number to routing transit numbers that are known to be linked to fraudulent activity. The data store may also include a region indicator (e.g., state name, Midwest, east coast, etc.), a fraud code (i.e., predetermined codes assigned to a type of fraud), a bank name, a frequency of item occurrence, a date of the transaction, a purge date of the transaction, hit data of the transaction, and/or a source of the transaction (e.g., ATM, teller, etc.). Such transactions may be manual (e.g., a customer transacting with a bank teller) or automatic (e.g., a customer using an ATM with a check image scanner.)

Typically, the dollar amount 207 is the amount of money that is associated with the transfer of money. The dollar amount 207 may include a range of dollar amounts 207. The range may be a numerical group of dollar amounts or may be any grouping of dollar amounts. For example, a financial institution may determine that a perpetrator presents counterfeit checks for the amount of $800, $4,500, and $8,950. In this case, the range would include the dollar amount of $800, $4,500, and $8,950. In another example, the financial institution may determine that a perpetrator presents counterfeit checks for amounts that vary between $2452 and $2560. In this case, the range of dollar amounts would be identified as all dollar amounts falling within the range of $2452 and $2560.

Information relating to the payee in transaction may be analyzed. A payee is the person to whom the money may be transferred during a transaction. The payee may be the customer or any third party, such as a perpetrator of a Nigerian 419 fraud ring. The information about the payee may include the payee's prior transactions and the payee's account history. The payee's prior transactions may include information relating to all of the transactions that a payee made with respect to the payee's account and may include information relating to all of the payee's transactions that are unrelated to a customer account at the financial institution, such as cashing or depositing a check from a third party. A person having ordinary skill in the art will appreciate that the financial institution may establish that any desirable information relating to the transaction may be analyzed during the transaction.

In accordance with various aspects of the disclosure, a data store may contain filter data identified as corresponding to known fraudulent (i.e., bad/returned) items that meet stringent criteria for being part of an advanced fee scan or other fraudulent activity. The filter data may be extracted at a check processing facility by extracting the relevant information from a full-field MICR (magnetic ink character recognition) read. Such filter data may be voluminous and require a significant amount of time to process due to the volume of checks that typically come through a check processing facility. In addition, if the filter data is compared to checks (or other transactions causing the transfer of money) at the time they are deposited (e.g., when submitted to a teller for intake), it may be desirable for the comparison (in step 203) to occur with a reasonable amount of time (e.g., near real time). Consequently, aspects of the invention are configured to analyze the filter data in the data store such that data points that are proven to result in a zero false positive result are used. For example, the routing transit number associated with a customer's transaction may be compared with a plurality of routing transit number (or range of routing transit numbers) in the data store known to be related to fraudulent activity.

At step 209, an alert may be output when fraud is detected in the transaction. The alert may be in the form of a warning message on a computer display at a financial institution. The warning message may be in the form of text or an image. The warning message may alert either a teller or a customer. The warning message may include information that informs the teller that a hold must be placed on the transactions, that a transaction is rejected, that a telephone number must be called to verify the transaction, or the like. The warning message may be displayed on a computer display including a teller's personal computer and an ATM. The warning message may appear in real-time during the transaction, may appear after the financial institution performs analysis upon the transaction the following day, or the like.

When fraud is detected in step 209, the teller or customer may be prevented from performing an account activity. The teller or customer may be prevented from performing the transaction, money may be unable to be transferred into or withdrawn from the customer's account, the customer's account may be closed or placed on a temporary freeze, or the like. For example, the financial institution may prevent a cash withdrawal from the account receiving the transfer of money when fraud is detected in the transaction.

Figure 3:
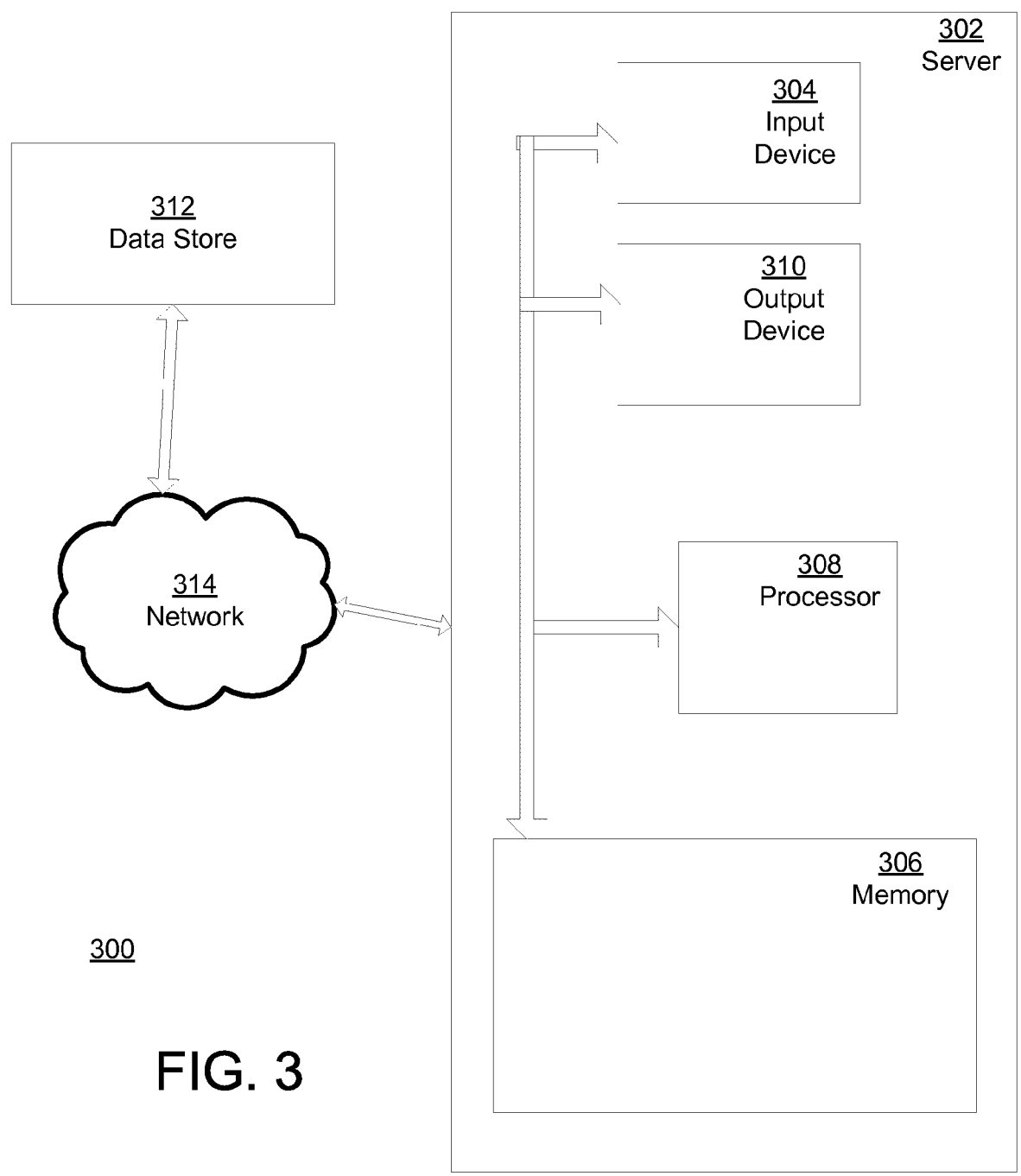
FIG. 3 shows an illustrative operating environment in which various aspects of the disclosure may be implemented.

Referring to FIG. 3, a system for providing enhanced protection from fraud is illustrated. The system 300 may comprise a computing device (e.g., server 302) configured with a processor 308, memory 306, input device 304, output device 310, and other components (as illustrated in FIG. 1) as desired. The input device 304 (e.g., a check image scanner) may be configured to receive data corresponding to a transaction including a transfer of money. The system 300 may also include a filter stored in memory 306 and executed by processor 308 that is configured to detect fraud in a transaction where the protection against the fraud occurs with zero false positives. A data store 312 comprising at least one serial number and at least one dollar amount may also be included in the system. The data store 312 may communicate with server 302 via a network 314. The system may include an output device 310 (e.g., a display screen on a computing device) that may be configured to output an alert if fraud is detected in the transaction.

In one example, a filter in accordance with aspects of the disclosure detects fraud in near real time (e.g., within a matter of seconds and/or minutes). The filter may be software installed and executable on a computing machine. The filter may receive transfer data and compare it against filter data stored in a data store. The filter may within a matter of seconds and/or minutes generate an output indicating if a fraudulent transaction has been detected. The filter may compare one or more various data against various filter data stored in the data store to make such a determination. Alternatively, the filter detects may obtain transfer data and store the data for a duration of time before analyzing the data at a later time. In such a case, the filter may not return fraud detection results instantaneously. Rather, the filter may analyze and/or compare the data at a later time and provide the output at a later time (e.g., on a second business day, or at least an hour later). At least one benefit of such a system may be the reduced computational requirements and priority assigned to such analysis/comparison. In addition, such systems may be sufficient and/or desirable in the case where a customer may deposit a check after business hours.

Although illustrative embodiments in accordance with aspects of the disclosure is disclosed above, it should be appreciated that a computer system, as depicted, is not necessary in all embodiments of the disclosure. Rather, aspects of the disclosure may be implemented without the use of such a computer system. For example, one or more method claims recited below do not necessarily require the technological arts of a computer system in order to be performed. In yet another example in accordance with various aspects of the disclosure, a financial institution may provide a book with a table listing various filter data that a teller may manually scan to detect fraudulent activity. Such an example may be desired in a situation where computing devices are not available (e.g., during an electricity blackout.)

Although not required, one of ordinary skill in the art will appreciate that various aspects described herein may be embodied as a method, a data processing system, or as a computer-readable medium storing computer-executable instructions. Aspects of the invention have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

We claim:

1. A method for providing enhanced protection from fraud, comprising:
    receiving transfer data corresponding to a transaction include a transfer of money;
    comparing the transfer data to filter data in a data store, the filter data including at least one serial number and at least one dollar amount; and
    outputting an alert if fraud is detected in the transaction, the alert resulting in zero false positives.

2. The method of claim 1, where the transfer data includes data on a check.

3. The method of claim 1, where the at least one serial number includes a range of serial numbers, and the at least one dollar amount includes a range of dollar amounts.

4. The method of claim 1, comprising analyzing information about a payee of the transaction, the information including the payee's prior transactions and account history.

5. The method of claim 1, where the comparing includes matching a serial number associated with the transaction with at least one serial number in the data store.

6. The method of claim 1, comprising, preventing a cash withdrawal from an account receiving the transfer of money if fraud is detected in the transaction.

7. The method of claim 1, where the alert includes text displayed in a warning message on a computer display in a financial institution.

8. The method of claim 1, comprising, identifying a fraud type for fraud protection.

9. The method of claim 8, where the fraud type detected is a Nigerian 419 fraud ring.

10. The method of claim 8, where the fraud type detected is an advanced fee scam.

11. The method of claim 8, where the fraud type detected is a transfer of money from a closed account.

12. A system for providing enhanced protection from fraud, comprising:
   an input device configured to receive data corresponding to a transaction including a transfer of money;
   a filter configured to detect fraud in a transaction, the detecting occurring with zero false positives;
   a data store comprising at least one serial number and at least one dollar amount; and
   an output device configured to output an alert if fraud is detected in the transaction.

13. The system of claim 12, where the input device comprises a check scanner.

14. The system of claim 12, where the filter is configured to compare the at least one serial number to a plurality of serial numbers that is stored in the data store.

15. The system of claim 12, where the filter is configured to compare the at least one dollar amount to a plurality of dollar amounts that is stored in the data store.

16. The system of claim 12, where the data store includes a full account number and a range of suspicious routing transit numbers, and the filter is configured to compare the full account number to a plurality of suspicious account numbers.

17. The system of claim 12, where the data store includes at least one of: a region indicator, a fraud code, a bank name, a frequency of item occurrence, a date of the transaction, a purge date of the transaction, hit data of the transaction, a source of the transaction.

18. The system of claim 17, where the transaction is a manual transaction.

19. The system of claim 17, where the transaction is an automatic transaction.

20. The system of claim 12, where the output device is a display screen at a bank teller station and the alert includes text displayed in a warning message on the display screen.

21. The system of claim 12, where the output device is a display screen at an automated teller station and the alert includes text displayed in a warning message on the display screen.

22. The system of claim 12, where the filter detects fraud in near real time.

23. The system of claim 12, where the filter detects fraud at least an hour after receiving the data corresponding to the transaction.

24. A computer-readable medium storing computer-executable instructions causing a processor to perform a method, comprising:
   receiving data corresponding to a transaction including a transfer of money;
   comparing the data corresponding to the transaction to data in a data store, the data in the data store including at least one serial number, at least one dollar amount, at least one routing transit number, and at least one account number; and
   outputting an alert if fraud is detected in the transaction, the alert resulting in zero false positives.

25. A method for providing enhanced protection from fraud, comprising:
   receiving transfer data corresponding to a transaction include a transfer of money;
   comparing the transfer data to filter data in a data store, the filter data including at least one routing transit number and at least one account number; and
   outputting an alert if fraud is detected in the transaction, the alert resulting in zero false positives.

26. The method of claim 25, where the comparing includes matching a routing transit number associated with the transaction with at least one routing transit number in the data store.

27. The method of claim 25, where the comparing includes matching an account number associated with the transaction with at least one account number in the data store.

28. The method of claim 25, comprising, identifying a fraud type for fraud protection, where the fraud type detected is a transfer of money from a non-existent account.

* * * * *